US012434299B2

(12) United States Patent
Gibb et al.

(10) Patent No.: US 12,434,299 B2
(45) Date of Patent: Oct. 7, 2025

(54) ADDITIVELY MANUFACTURED SOLAR PANEL ASSEMBLIES

(71) Applicant: Lockheed Martin Corporation, Bethesda, MD (US)

(72) Inventors: John L. Gibb, Sunnyvale, CA (US); Ivan Audon Lucatero Sanchez, Soquel, CA (US); Adan Alberto Giron, San Jose, CA (US); Scott T. Santo, San Jose, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 119 days.

(21) Appl. No.: 18/495,854

(22) Filed: Oct. 27, 2023

(65) Prior Publication Data

US 2025/0135543 A1    May 1, 2025

(51) Int. Cl.
*B33Y 80/00* (2015.01)
*B22F 10/28* (2021.01)
*B22F 10/66* (2021.01)
*B64G 1/44* (2006.01)
*H02S 30/10* (2014.01)
*H02S 30/20* (2014.01)
*H02S 40/36* (2014.01)
*B33Y 10/00* (2015.01)
*B33Y 40/20* (2020.01)

(52) U.S. Cl.
CPC ............. *B22F 10/28* (2021.01); *B22F 10/66* (2021.01); *B64G 1/443* (2013.01); *H02S 30/10* (2014.12); *H02S 30/20* (2014.12); *H02S 40/36* (2014.12); *B33Y 10/00* (2014.12); *B33Y 40/20* (2020.01); *B33Y 80/00* (2014.12)

(58) Field of Classification Search
CPC . B22F 10/28; B22F 10/66; B22F 5/10; B64G 1/443; H02S 30/10; H02S 30/20; H02S 40/36; B33Y 10/00; B33Y 40/20; B33Y 80/00
See application file for complete search history.

(56) References Cited

U.S. PATENT DOCUMENTS

| 6,637,702 | B1 | 10/2003 | McCandless |
| 10,370,126 | B1 | 8/2019 | Harvey |
| 2018/0278200 | A1* | 9/2018 | Jeon ......................... H02S 30/20 |
| 2021/0354856 | A1* | 11/2021 | Aston .................... B64G 1/228 |
| 2023/0066735 | A1 | 3/2023 | Van Den Nieuwenhof et al. |

FOREIGN PATENT DOCUMENTS

| CA | 2617331 A1 | 1/1997 |
| CN | 104901611 B | 5/2017 |

* cited by examiner

*Primary Examiner* — Angelo Trivisonno

(57) ABSTRACT

Provided herein are various enhancements for solar panels and associated solar arrays. In one example, a method of manufacturing includes forming, by an additive manufacturing process, a stackup of half-panels comprising connected pairs of the half-panels each having an integrated construction comprising a webbing structure connected to a skin layer substantially covering a face. The method also includes separating the stackup into detached pairs of the half-panels, assembling a selected detached pair of the half-panels into a full panel, and attaching photovoltaic cells to a selected face of the full panel.

17 Claims, 9 Drawing Sheets

ADDITIVELY MANUFACTURED SOLAR PANEL ASSEMBLIES

GOVERNMENT RIGHTS STATEMENT

This invention was made with Government support under contract no. HQ085020C0009 awarded for the Space Transport Layer by the Space Development Agency (SDA). The Government has certain rights in the invention.

TECHNICAL BACKGROUND

Solar arrays are frequently deployed on satellites or other spacecraft, as well as terrestrial vehicles and structures. Typical construction of solar arrays or individual solar panels include photovoltaic cells mounted onto a substate material or structure. For space-deployed solar arrays, these substrates are often constructed from lightweight materials, which can include flexible/rollable or film-mounted solar arrays, as well as more rigid panels having a hexagonal internal structure or "honeycomb" core. These panels can include thin-walled honeycomb cores sandwiched between thin face skins made with composite or metallic materials such as carbon fiber or aluminum. These honeycomb-style panels do provide a relatively light structure that is stiff and stable relative to their size, and are suited toward mounting solar photovoltaic cells and attaching them to a spacecraft. However, construction of these honeycomb/laminated panels have long manufacturing lead times of many months due in part to the specialized manufacturing processes and materials required. In addition, these panels are relatively expensive. Also, these panes frequently have a significant amount or workmanship variation due to layup and lamination processes required.

Historically, large lightweight panels, including solar array panels, that were not produced by the honeycomb sandwich panel method, were produced using conventional subtractive machining processes whereby large plates are milled into desired structures, or by using sheet metal techniques such as stamping, riveting and welding. These techniques result in relatively thick walls, such as when formed by machining, or include many workmanship concerns. such as when formed using sheet metal, welding, or riveting. Chemical milling has been used to make lightweight stiffened panels, but the limited types of producible structures as well as the toxic and caustic waste products have limited use of this technique.

SUMMARY

Lightweight, rigid, and producible monolithic solar panels are presented. These solar panels can be additively manufactured to avoid the schedule and cost barriers present with existing honeycomb panels. The examples herein include skin and stiffening structures which are contiguous and optimized for stiffness and strength relative to weight, as well as employing additive construction from materials such as powdered metals or composites/polymers. The production process for such panels can be completed in days instead of months, and prices can be reduced by an order of magnitude compared to other panels. In the examples herein, a stackup of half-panels is manufactured with an additive manufacturing process. This stackup of half-panels is formed into a set of full panels when the paired half-panels are separated from the stackup and folded outward. This configuration can not only rapidly and efficiently produce lightweight solar panels, but can also mitigate distortion/ warping from the heat of manufacturing on thin-walled structures, such as when using a laser powder bed fusion additive manufacturing process.

In one example implementation, a method of manufacturing includes forming, by an additive manufacturing process, a stackup of half-panels comprising connected pairs of the half-panels each having an integrated construction comprising a webbing structure connected to a skin layer substantially covering a face. The method also includes separating the stackup into detached pairs of the half-panels, assembling a selected detached pair of the half-panels into a full panel, and attaching photovoltaic cells to a selected face of the full panel.

In another example implementation, a method of manufacturing includes forming, by an additive manufacturing process, a plurality of paired half-panels. Each of the half-panels comprises an integrated construction having a webbing structure substantially establishing a rear face connected to a skin layer substantially establishing a front face. The method also includes heating the plurality of paired half-panels to achieve a stress relief property in a material of the integrated construction, and separating connected pairs of half-panels from the plurality of paired half-panels. The method also includes applying one or more coatings to the connected pairs, opening the connected pairs to establish full panels coupled at corresponding sides, and attaching photovoltaic elements to front faces of the full panels.

In yet another example implementation, an apparatus includes a solar panel comprising a connected pair of half-panels each having an integrated construction comprising a webbing structure substantially establishing a rear face coupled by an internal lattice to a skin layer substantially establishing a front face. The apparatus also includes photovoltaic cells attached onto the front face, and cabling for the photovoltaic cells coupled onto the rear face.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
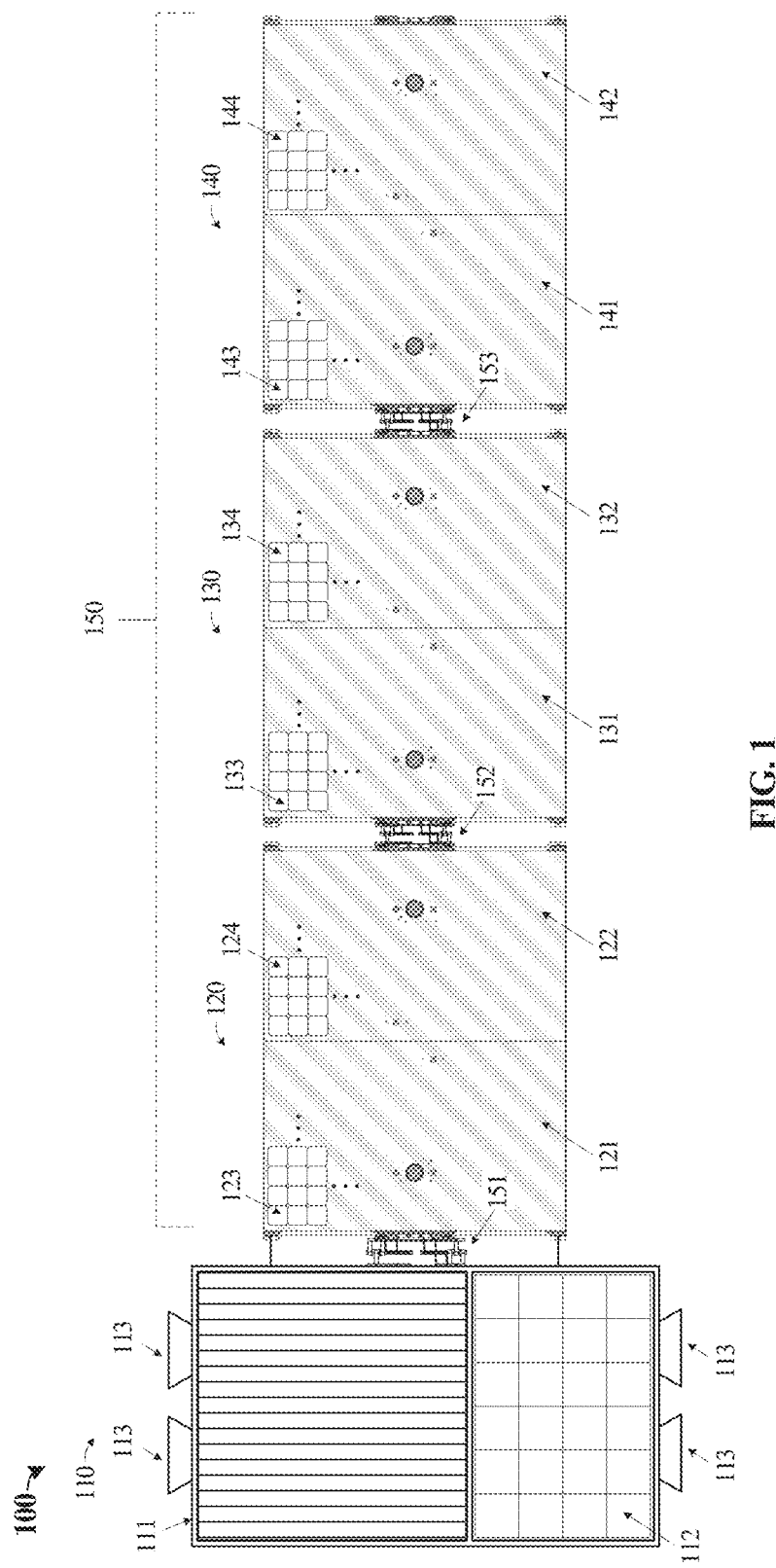
FIG. 1 illustrates a satellite having a solar array in an implementation.

Solar panels, such as those having photovoltaic cells applied to substrate carrier materials or structures can take various forms. Among these are rigid panels configured to provide a structural backing to photovoltaic cells. However, as noted above, many existing types of these panels, such as honeycomb panels, suffer from high manufacturing cost, long lead times, and often employ specialized composite materials. Discussed herein are lightweight, rigid, and highly producible monolithic solar panels. These solar panels can be additively manufactured using powdered metals or composites/polymers to include outer skin surfaces and internal/external structures which are contiguous and optimized for stiffness and strength relative to weight.

In the examples herein, a combined quantity or stackup of half-panels is manufactured as an integrated single workpiece with an additive manufacturing process. This stackup of half-panels is formed into a collection of full panels when paired half-panels are separated from the stackup and folded outward. This configuration can not only rapidly and efficiently produce lightweight solar panels, but can also mitigate distortion/warping from the heat of manufacturing on thin-walled structures, such as when using a laser powder bed fusion additive manufacturing process. Advantageously, the examples herein describe lightweight, additively manufactured (e.g., 3D-printed) panels that are monolithic, with contiguous skin and stiffening structures. When employed in a manufacturing process, a production process can be completed in days instead of months compared to honeycomb style of panels, with a comparative price reduced by an order of magnitude or more.

This additively constructed solar panel can be faster and less expensive to manufacture than conventional machining, honeycomb manufacturing, or sheet metal construction. Also, the monolithic additive design avoids issues with lamination/delamination in honeycomb panels and allows tailoring of the substrate features to be strengthened at load points such as launch restraints, mounting anchor points, or inter-panel hinges. The monolithic additive design may be scaled to different sizes than discussed herein, even if the corresponding process machinery (e.g., additive build space) has size limits, such as by printing segments and joining them at parting lines to make a complete assembly. Finally, the webbing structures discussed herein can include isogrid or pseudo-isogrid styles of structures. Pseudo-isogrid structures comprise structures having portions comprising isosceles triangle-based isogrid structures and portions which deviate from a strict isogrid arrangement to provide various features for cable clip attachment, merging with surrounding surface material/skin, and may include other features such as rounded corners, transition/perimeter features, and other similar elements that incorporate isogrid features into an integrated face/skin. These webbing structures can include surface structures and internal lattice structures, and can be extremely tolerant to damage and have corresponding high structural margins due in part to the webbing structure itself and integrated construction configuration techniques for a continuous single-workpiece panel lacking adhesive joints that may fail.

Turning now to a first example implementation, FIG. 1 is presented. FIG. 1 includes system 100 featuring satellite 110 having solar array 150 coupled by mount 151. Satellite 110 also includes satellite bus 111, communication array 112, and thrusters 113. Solar array 150 includes three "full panel" solar panels 120, 130, and 140, each formed from half-panels 121-122, 131-132, and 141-142, respectively. Also included in solar array 150 are photovoltaic cells applied to each half-panel, namely photovoltaic cells 123-124, 133-134, and 143-144, with only a portion of the photovoltaic cells shown for clarity.

Satellite 110, while representative in this example of any space vehicle or spacecraft deployed into an orbital configuration or non-orbital trajectory, can instead comprise a terrestrial vehicle, aircraft, seafaring vessel, stationary element, or other device. Satellite 110 can include various elements to perform one or more mission tasks, including sensors, propulsion elements, communication (transmission/reception) elements, thermal control elements, power systems, and other various elements. View 100 shows satellite 110 having satellite bus 111, communication array 112, and thrusters 113, but this complement of elements can vary based on application. Satellite 110 might be launched by a launch vehicle and placed into an orbital configuration or trajectory before deployment of solar array 150, or with a partial deployment of solar array 150. Various deployment features might be included, such as hinges 152-153 as well as mount 151. Also, aiming, gimbaling, or orientation elements can be included to selectively orient solar array 150 or satellite 110 towards incident illumination, for communication directivity, thermal management operations, or sensing operations. Such elements might be included in mount 151 or hinges 152-153.

To provide power to various on-board elements, solar array 150 is included, which generates electrical current based on incident solar illumination. Solar array 150 comprises one or more sets of photovoltaic cells 123-124, 133-134 arranged on solar panels 120, 130, and 140 which are configured to convert incident solar illumination to electrical power. The composition of photovoltaic cells 123-124, 133-134 might vary based on application, but can include semiconductor-based photovoltaic cells, silicon-based photovoltaic cells, III-V compound semiconductors based solar cells, polycrystalline solar cells, heterojunction solar cells, perovskite solar cells (PSCs), or others. This electrical power can be provided to various on-board systems of satellite 110, such as the elements described herein as well as various payload elements, scientific instruments, communication and ranging elements, monitoring and control elements, as well as various propulsion, guidance, orientation, station-keeping, reaction control, attitude adjustment, and orbital adjustment elements.

Figure 2:
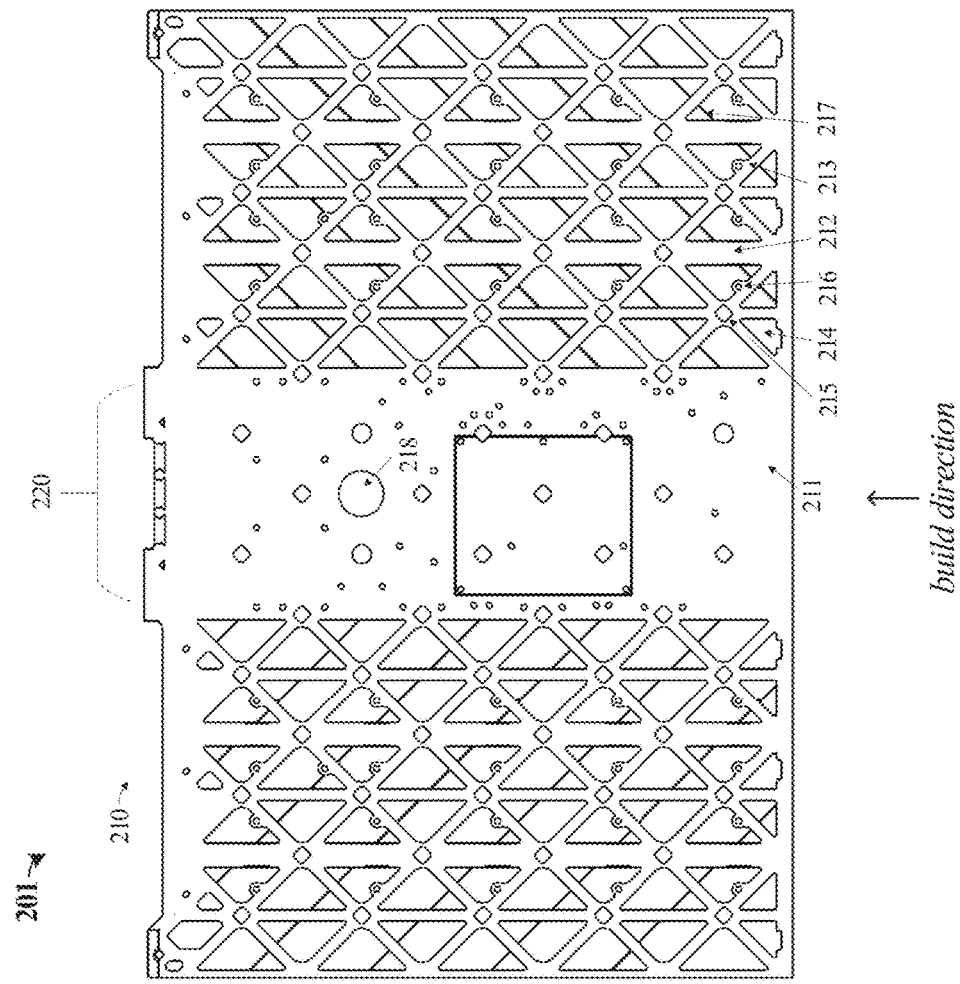
FIG. 2 illustrates a half-panel solar panel substrate in an implementation.
Figure 2:
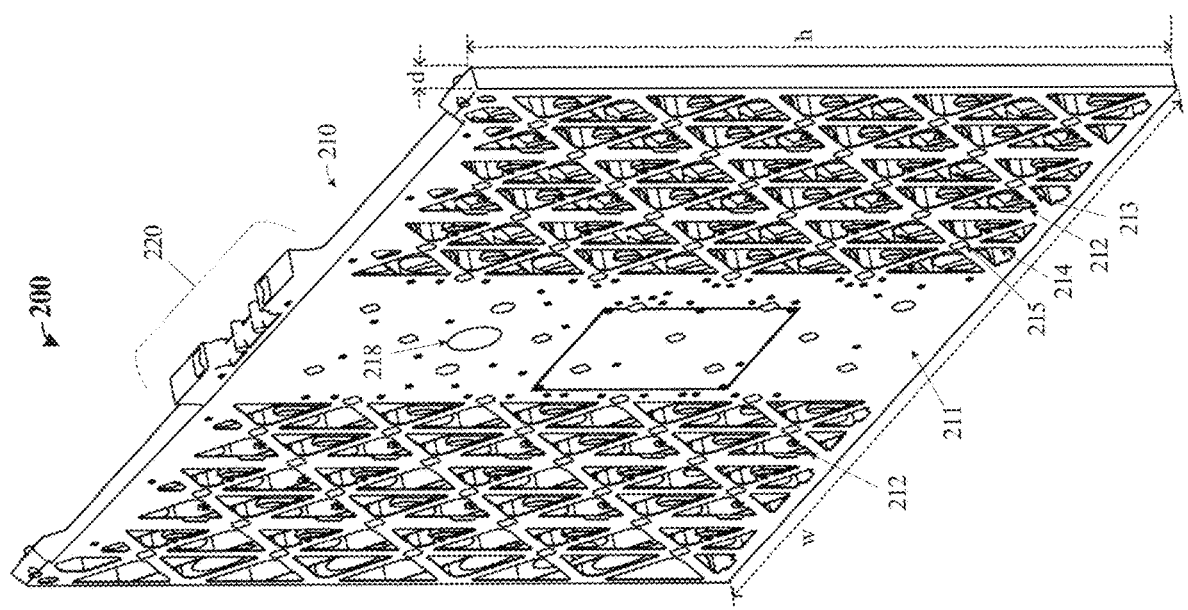
Figure 3:
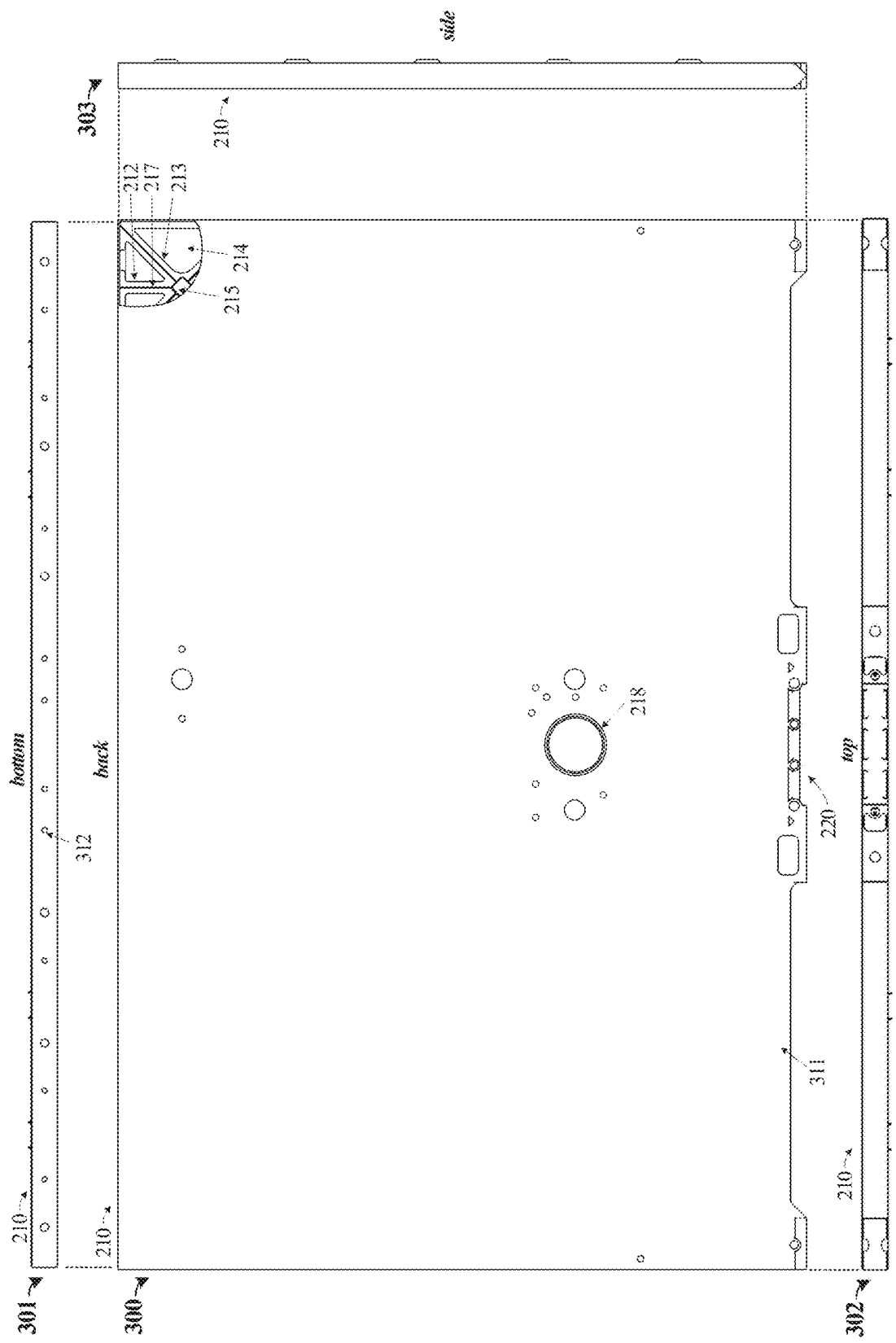
FIG. 3 illustrates a half-panel solar panel substrate in an implementation.
Figure 4:
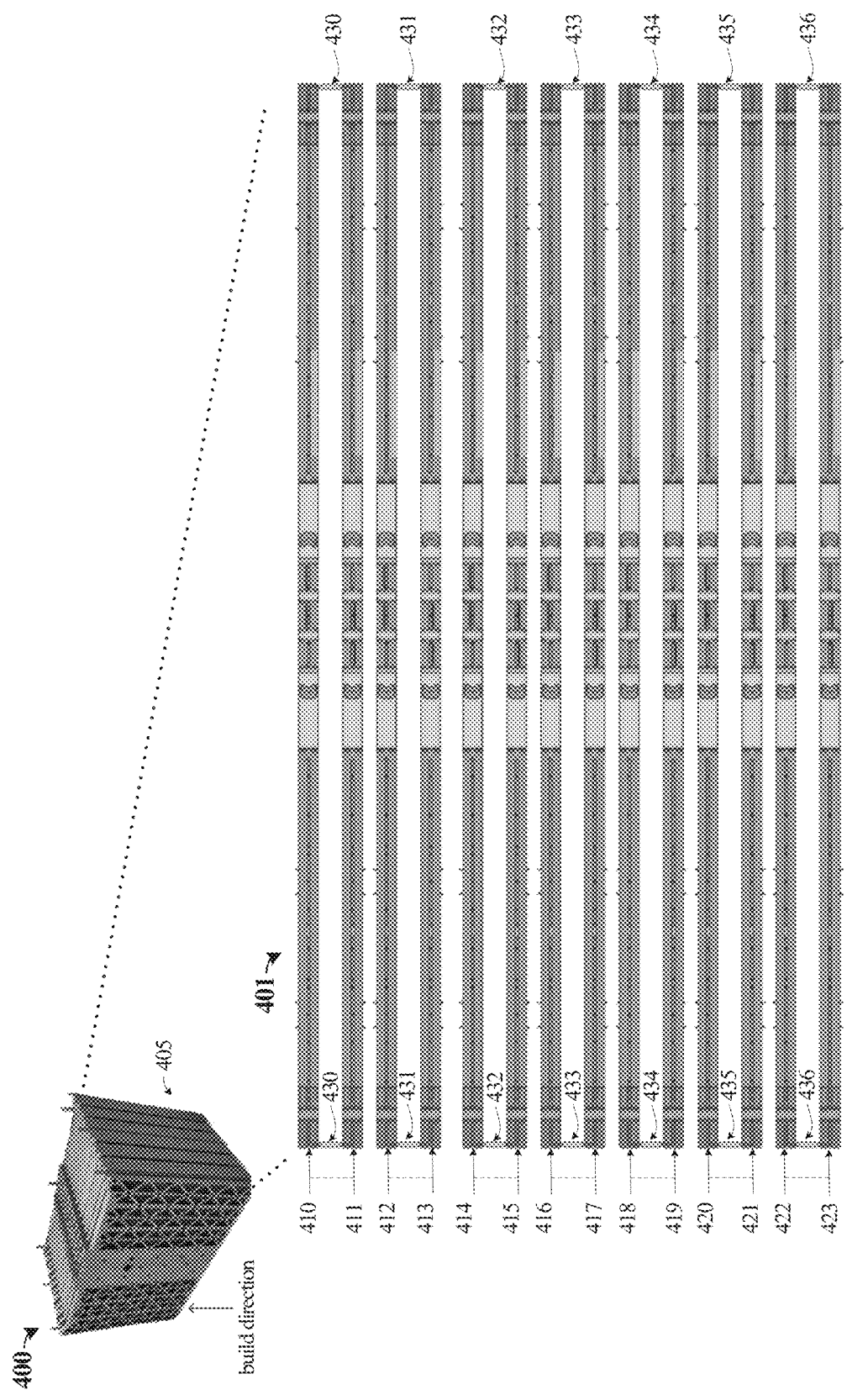
FIG. 4 illustrates a manufactured stackup of solar panel substrates in an implementation.

The further examples herein describe various techniques, materials, processes, and apparatuses for implementing solar array 150 and solar panels 120, 130, and 140. Turning to a first example implementation, FIGS. 2-3 are included. FIG. 2 includes views 200 and 201, with view 200 having an isometric view of a rear face of half-panel 210, and view 201 having a side view the rear face of half-panel 210. FIG. 3 includes views 300-303, with view 300 having a side view of a front face of half-panel 210, view 301 having a bottom view of half-panel 210, view 302 having a top view of half-panel 210, and view 303 having a side view of half-panel 210. An additive manufacturing technique can be employed to form half-panel 210, along with several other half-panels in an integrated stackup having a build direction or "printing" direction as shown for view 201. Two half-panels can then be joined together to form a full panel assembly. FIG. 4 illustrates an example stackup, and FIGS. 6-7 s illustrate how full panel assemblies.

Returning to FIG. 2, half-panel 210 forms a portion of a solar panel substrate and comprises webbing structure comprising features 212-216 on rear face 211 coupled by an internal lattice structure 217 to skin layer (hidden from view) on a front face. The front face and the rear face (211) of half-panel 210 are coupled by internal lattice 217 comprising a selected material that also forms the webbing structure and the skin layers. The webbing structure can comprise an isogrid family of webbing comprising a patterned arrangement of triangles (e.g., isosceles triangles), although variations are possible. Half-panel 210 also includes webbing transverse portions, webbing diagonal portions 213, webbing voids 214-215, cable attachment features 216, and mounting features 218 and 220. Mounting feature 218 can be employed for mounting to test fixtures or manufacturing fixtures, as well as for routing cabling between faces of the panel. Mounting feature 220 can be employed for mounting full panel assemblies to other full panel assemblies or to vehicles/satellites. Half-panel 210 can have various dimensional properties, but for the example shown in FIG. 2, a height (h) of 16 or 18 inches, a width (w) of 27 inches, and a thickness (d) of 0.5 inches is included.

Turning now to FIG. 3, view 300 shows front face 311 of half-panel 210. Front face 311 has a small portion of a corresponding skin removed in view 300 to illustrate details of internal lattice 217 and webbing structure features 212-216. Additionally, mounting feature 218 is shown as penetrating through both faces of half-panel 210 in this example. Views 301-303 show additional sides of half-panel 210. In bottom view 301, various mounting holes 312 are seen which can be employed to couple more than one half-panel into a full-panel assembly. After half-panel 210 is formed, another half-panel can be attached to the "bottom" end of half-panel 210 to form the aforementioned full-panel assembly. Photovoltaic cells can be applied to front face 311, which may include adding one or more protection layers between the photovoltaic cells and front face 311, such as anodization and dielectric isolation layers.

FIG. 4 illustrates a manufacturing stackup assembly 405 of a plurality of half-panels in isometric view 400. A build direction is also shown in view 400 which highlights an example additively manufacturing build direction or axis. Detailed top view 401 shows assembly 405 having seven (7) coupled pairs of fourteen (14) half-panels. Specifically, half-panels 410-411 form a pair coupled by material tab 430, half-panels 412-413 form a pair coupled by material tab 431, half-panels 414-415 form a pair coupled by material tab 432, half-panels 416-417 form a pair coupled by material tab 433, half-panels 418-419 form a pair coupled by material tab 434, half-panels 420-421 form a pair coupled by material tab 435, and half-panels 422-423 form a pair coupled by material tab 436.

During manufacturing, assembly 405 is formed as an integrated unit from the same material and as the same workpiece. Pairs of half-panels can be formed into full-panel assemblies, and are typically coupled at one end (e.g., bottom end in FIG. 3) from the manufacturing process to allow the two coupled half-panels to be folded outward to form a full-panel assembly. Also, as seen in FIGS. 1-2, an integrated webbing structure, internal lattice, and front face or skin are formed concurrently for all of the panels in assembly 405 using the same additive manufacturing process.

Once assembly 405 is manufactured or 'printed' then excess material can be removed, such as excess powdered metal. This may entail allowing the stackup to cool to an ambient temperature if the manufacturing process generates heat. Example manufacturing processes include laser powder bed fusion techniques, selective laser sintering (SLS) or other powder bed fusion (PBF) techniques. In laser powder bed fusion, one or more laser beams are directed at a deposited bed of powered metal which is selectively fused layer-by-layer to form complex 3D structures. In this example, assembly 405 can be formed with half-panels attached at a perimeter which can reduce or mitigate distortion/warping of the panels from the associated eat of manufacturing. Moreover, the printing process can be configured to include integrated tensile coupons to allow for testing of post-manufacture material properties of assembly 405. After formation of assembly 405, excess material removal, and cooling to ambient, a further heating assembly 405 can be performed to achieve a targeted stress relief property in a material of assembly 405. This stress relief can include bringing assembly 405 to a target temperature for a target amount of time, which can achieve annealing of the material forming assembly 405. Then, an additional cooling is performed, which can include natural cooling to ambient temperatures or quenching by a liquid or gas. Assembly 405 can then be separated into pairs of half-panels, each connected by the material tabs noted above.

After assembly 405 is separated into pairs of half-panels, one or more coatings can be applied. In a first example, an anodization process applies an anodization coating or anodization surface treatment to the material, this comprises a passivation coating to chemically passivate the material or provide oxidation protection, along with other advantages. Then, an isolation layer can be applied, which electrically isolates the material of assembly 405 (which may be conductive, even with anodization applied) from photovoltaic cells and associated wiring/circuitry. The isolation layer can include a dielectric coating, such as an epoxy dielectric layer.

Figure 5:
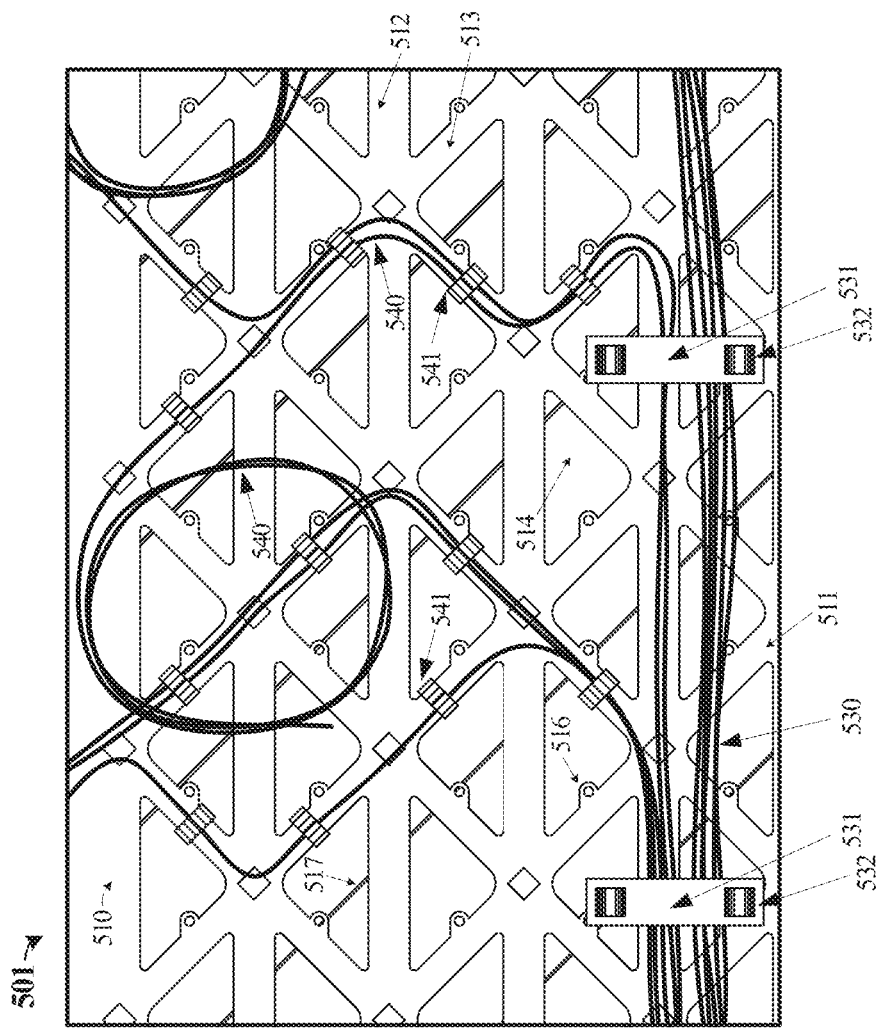
FIG. 5 illustrates integrated cable attachment features for a solar panel substrate in an implementation.
Figure 5:
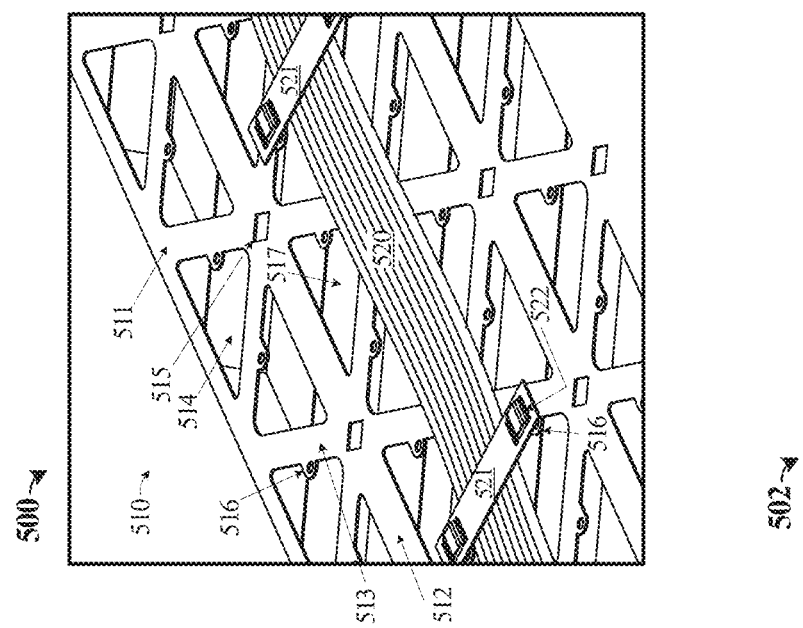
Figure 5:
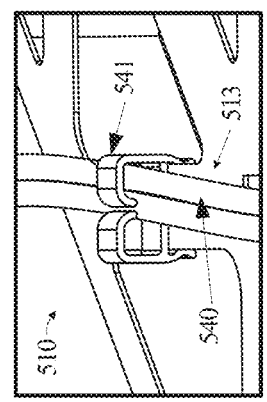

The pairs of connected half-panels can be opened to form full panels, which are coupled at corresponding perimeter sides connected by the material. A folding technique can open a paired set of half-panels into a full panel, with the folding occurring about a connected perimeter edge of the pair. Any additional material tabs can also be removed, such as by cutting, that previously held other perimeter sides of the half-panels together during the printing and heating/cooling/coating processes. Other post-processing includes removal of burrs and breaking of sharp edges of any machined/cut surfaces. Fasteners or adhesives can hold the two half-panels into the full panel configuration. In one example, bolts or screws are placed between the two half-panels once folded into the open configuration to maintain this open configuration. Next, photovoltaic cells can be applied to the front face or skin layer. Wires can be routed through the panels, across a back or rear face, and through wire clips or ties attached to various integrated attachment features on the rear face webbing. FIG. 5 highlights example wire and wire clip features. Finally, any full panel coupling elements can be applied between full panels, such as hinges, brackets, couplers, mounting devices, or other elements.

Example materials which can be employed to form any of the half-panels discussed herein can include any suitable metal, such as aluminum or aluminum alloys. Examine aluminum/alloy materials include A103/ASTM F3318 (AlSi10Mg) A356, A205/AMS 4471 6061-T6, A6061-RAM2 6061-T6, and 7A77-7075 w/Zr, among others. Other alloys are possible using the SLS or PBF processes, such as titanium (Ti64) and stainless steel (17-4 and 316L), Inconel 718, cobalt chrome, or copper, among others. Typically, a cover gas can be employed during a SLS or PBF process, such as an inert noble gas (e.g., Argon). Example thicknesses for the webbing structures can vary based on application, application requirements, and material properties, and other factors. For example, the material thickness can be selected based on targeted mass/weight, panel rigidity requirements, load bearing requirements, vibration resistance, or other considerations.

FIG. 5 illustrates wire clip attachment and wire routing for solar panels manufactured according to the examples herein. View 500 shows a first example of wire clips and ribbon-style cable routing. View 501 shows discrete wires which are routed along the various integrated webbing features of a solar panel. View 502 shows an example wire clip which can be attached onto a webbing feature.

In view 500, solar panel 510 is shown having rear face 511 formed with webbing features 512-516. Rear face 511 is coupled to a front face (hidden from view) by internal lattice structure 517, as well as corresponding panel perimeter material/edges. Webbing features include transverse members 512 which are interspersed with cross-members 513 forming a pseudo-isogrid arrangement. Voids 514-515 are included for rigidity and material efficiency, as well as to establish the pseudo-isogrid arrangement. Additionally, clip attachment features 516 are included to which wire attachment clips can be coupled. For example, view 500 shows wire restraints 521 having clips 522 which are inserted and held into features 516. Ribbon wire 520 can be held to rear face 511 using these clips and attachment features, and various routes can be established between photovoltaic cells and power control/distribution circuitry. Clips 522 can be attached to features 516 using spring-fit elements, compression-fit elements, button rivets, screws, or other fasteners or fastening devices.

View 501 shows another view of solar panel 510 having rear face 511 formed from a pseudo-isogrid webbing arrangement. Discrete wires 530 and 540 are routed over rear face 511 and attached thereto by wire restraints 531 and 541. Wire restraints 531 are similar to those found in view 500, and are attached to features 516 at clips 523. Wire restraints 541 attach directly to cross-members 513 (or transverse members 512) using a clip-on arrangement shown in view 502. As shown in view 502, wire restraint 541 has a lower member which slides and clips onto cross-members 513. Wire 540 can then be press-fit into jaws of wire restraint 541.

Figure 6:
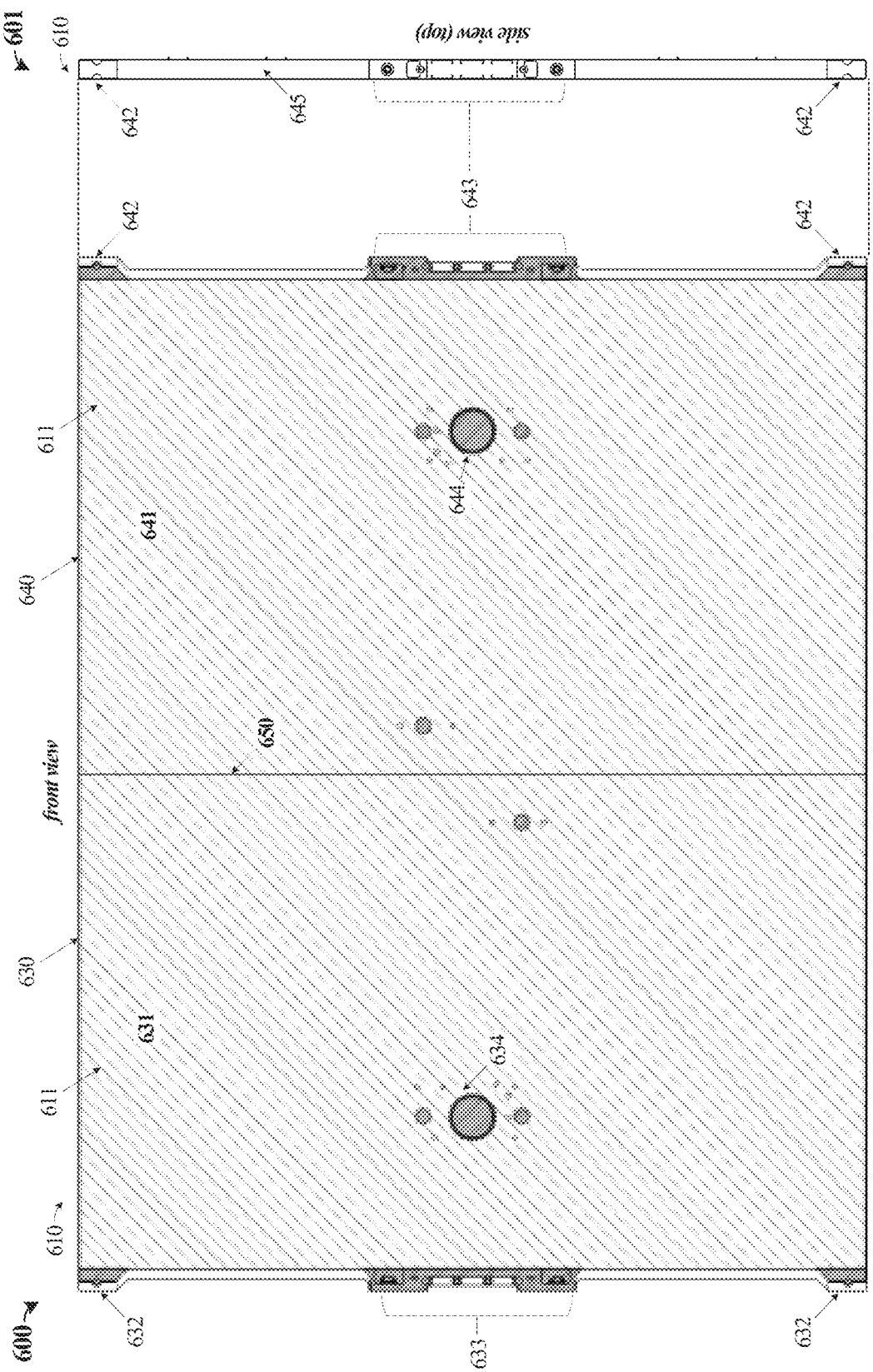
FIG. 6 illustrates a full panel solar panel substrate in an implementation.
Figure 7:
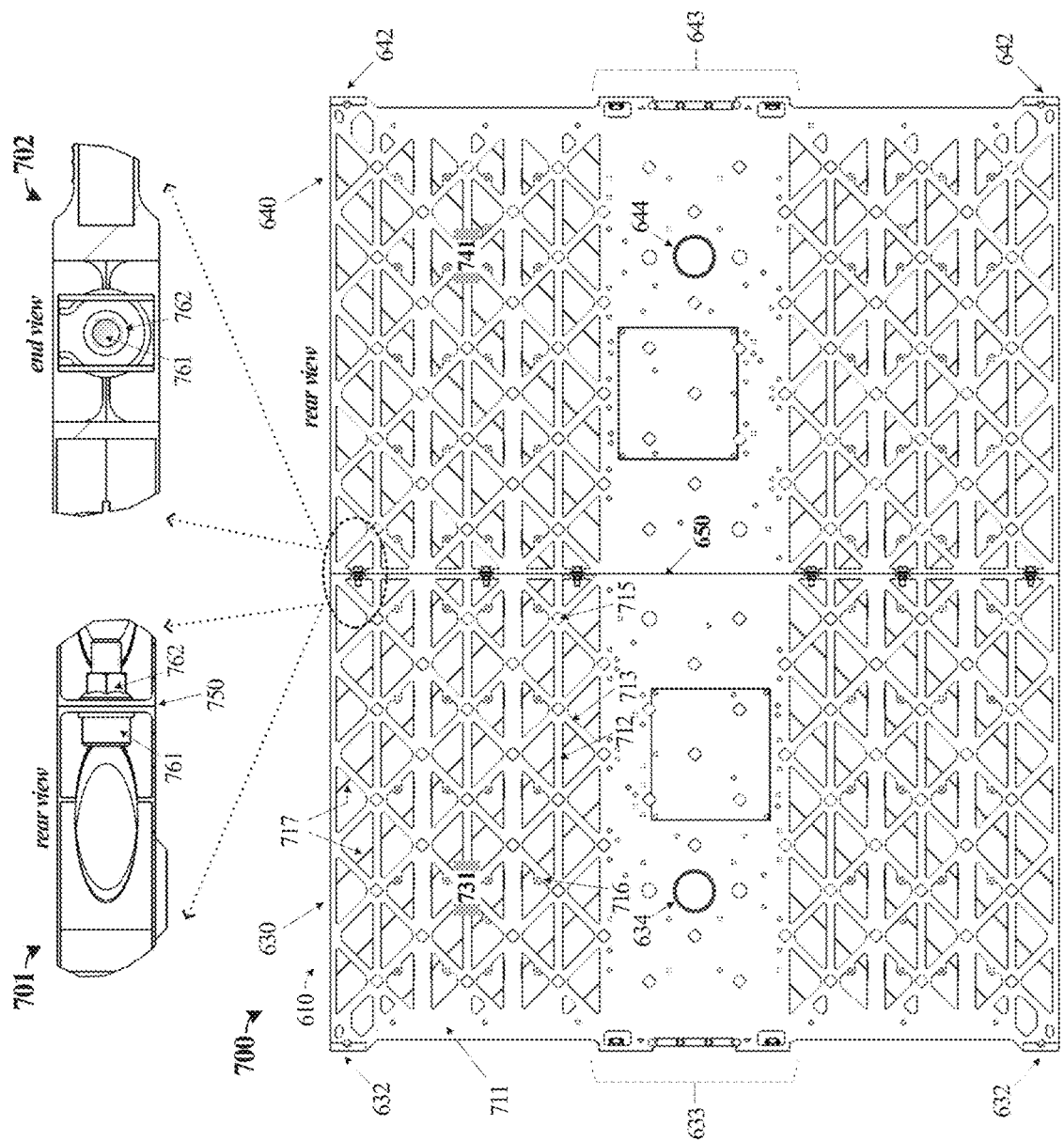
FIG. 7 illustrates a full panel solar panel substrate in an implementation.

FIGS. 6 and 7 are included to illustrate a full panel assembly formed from two half-panels, such as the half-panels discussed above. Turning first to FIG. 6, view 600 is a front side view of full panel assembly 610, view 601 is a side view of full panel assembly 610. When using half-panel dimensions noted above, full panel assembly 610 can have dimensions reflective of two panels mated together, although variations are possible.

View 600 shows front face 611 of full panel assembly 610 which forms a solar panel substrate. Full panel assembly 610 comprises two half-panels, namely half-panels 630 and 640, which are opened from a folded configuration into the generally planar or flat and open configuration shown in view 600. Various features can be seen in view 600 for half-panels 630 and 640, namely front side "skin" coverings 631 and 641, inter-panel attachment features 632, 633, 642, and 643, mounting/routing features 634 and 644, and panel joint 650. Mounting/routing features 634 and 644 can be employed for mounting assembly 610 or half-panels 630 and 640 to test fixtures or manufacturing fixtures, as well as for routing cabling between faces of the panel. Inter-panel attachment features 632 can be employed for mounting assembly 610 to other full panel assemblies to form a solar array, or to vehicles/satellites. View 601 illustrates a side view of assembly 610, featuring a view of perimeter side 645 formed with a similar material as skin 631 or 641, although this side/perimeter covering can be omitted in some examples.

FIG. 7 shows rear side view of full panel assembly 610. View 700 includes rear face 711 of full panel assembly 610, and views 701 and 702 are detailed views of example fasteners which couple two half-panels to form full panel assembly 610. Full panel assembly 610 comprises two half-panels, namely half-panels 630 and 640, which are opened from a folded configuration into the generally planar or flat and open configuration shown in view 700. Various features can be seen in view 700 for half-panels 630 and 640, namely rear side webbing structures 731 and 741, inter-panel attachment features 632, 633, 642, and 643, mounting/routing features 634 and 644, and panel joint 650. As can be seen in view 600, the webbing structure forms a pseudo-isogrid arrangement which covers a substantial portion of the rear face of full panel assembly 610. A central region of each half-panel is shown without a webbing structure, and instead comprise skin elements similar to the front faces. However, webbing structures can be included over the majority of rear face 711.

View 701 shows a detailed inset view of a portion of rear face 711 surrounding panel fastening features 761-762 which hold together two half-panels at panel joint 650. As discussed above, two half-panels can be manufactured as attached at one edge (650) and folded into an open configuration to form a full panel assembly. In addition, several fasteners can be employed to secure this arrangement into the open configuration. Accordingly, bolt 761 and nut 762 can be included at panel joint 650, along with various washers, locking elements, or adhesives. Alternatively, or in combination, a weld, such as spot welds, can be included at panel joint 650.

Once a full panel has been assembled, such as seen in FIGS. 6 and 7, these full panel assemblies can have various coatings applied along with photovoltaic cells which are arrayed over a front face. Then, more than one full panel assembly can be coupled together to form a solar array, and this array can be mounted to a vehicle, satellite, or other structure for operational usage. Various wiring and cabling can be routed over a rear face of the full panel assemblies to provide power links and status signaling to a vehicle, satellite, or other structure.

Figure 8:
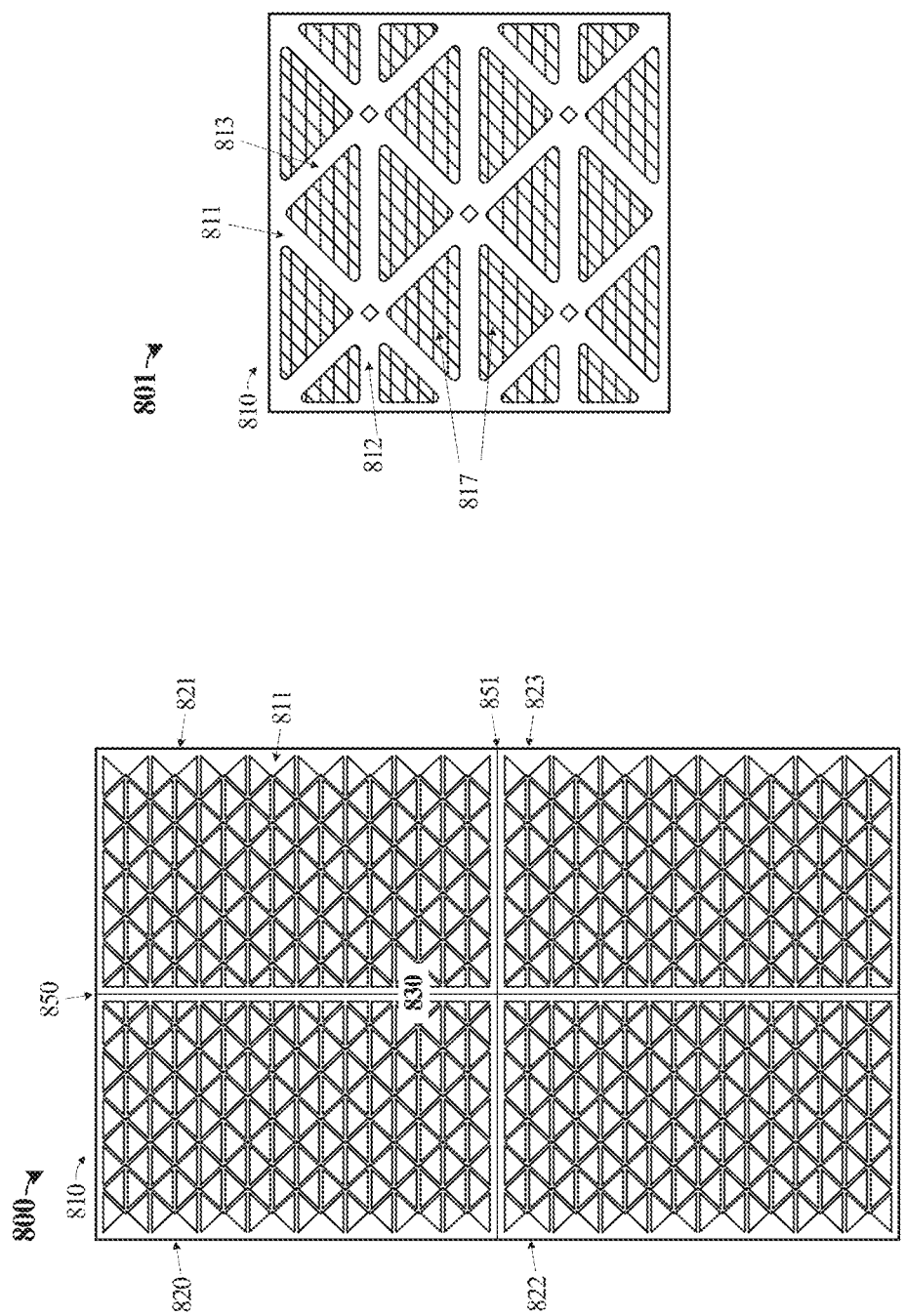
FIG. 8 illustrates a solar panel substrate in an implementation.

FIG. 8 illustrates an alternative implementation of a full panel assembly which comprises a solar panel substrate. In FIG. 8, view 800 shows rear face 811 of full panel assembly 810 formed from four sub-panels 820-823 attached at selected perimeter edges. Similar attachment structures and techniques as seen for the half-panels discussed herein can be applied to form assembly 810 from sub-panels. Thus, sub-panels 820-823 can be additively manufactured as an integrated unit but two or more sub-panels can be manufactured as connected along an edge and folded outward to form assembly 810.

A pseudo-isogrid webbing arrangement forms rear face 811. View 801 shows this pseudo-isogrid webbing arrangement as comprising transverse members 812 and diagonal members 813, as well as various corresponding voids. Additionally, an internal lattice structure 817 is shown as comprising fin members formed between a front face and rear face of each sub-panel in assembly 810. Similar mounting features, cable retention and routing features, and inter-panel mounting features can be included. Also, a front face of assembly 810 (not shown) can hold an array of photovoltaic cells.

Figure 9:
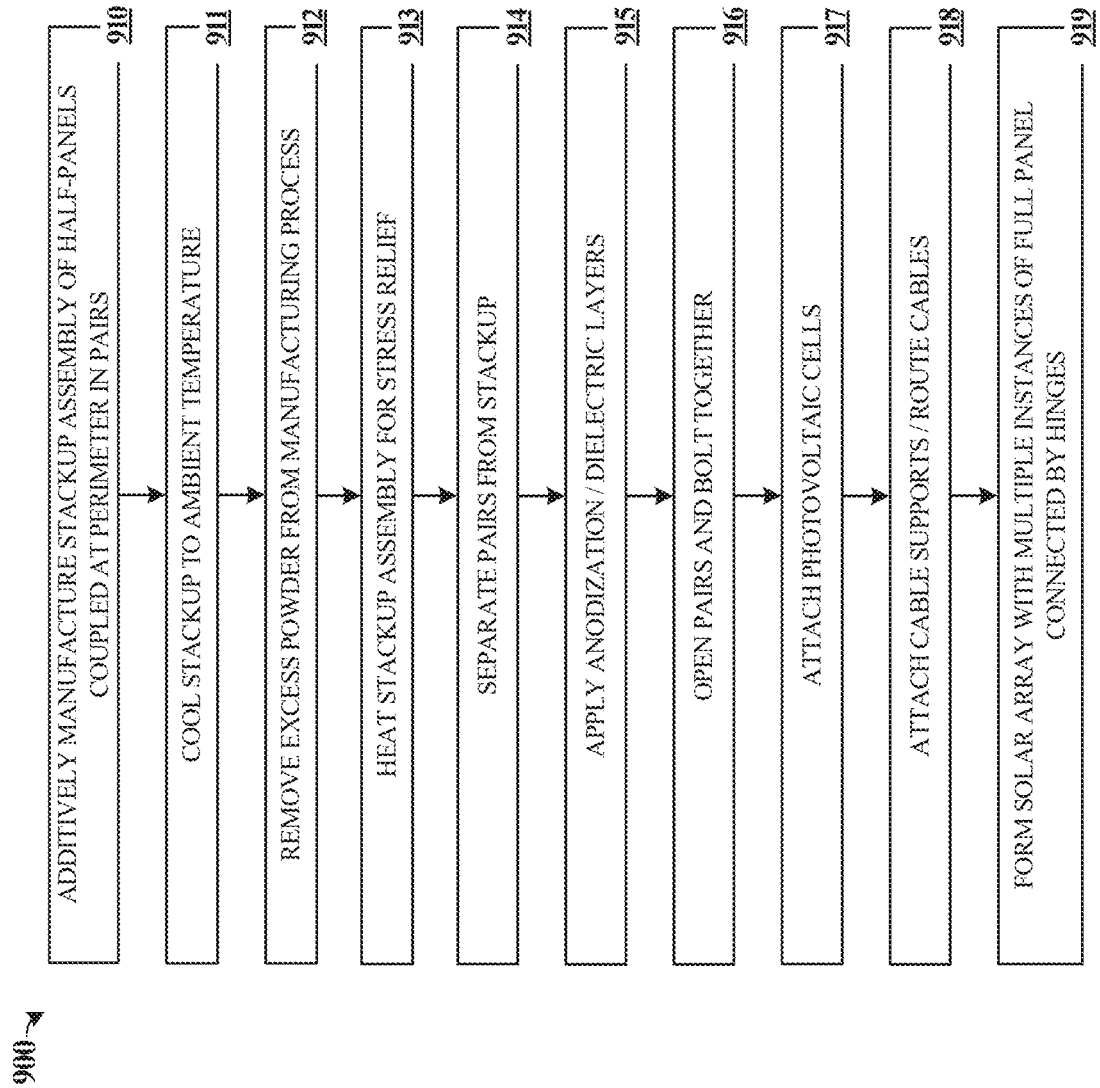
FIG. 9 illustrates a method of manufacturing solar panel substrates in an implementation.

FIG. 9 includes various operational steps which can be employed to form a solar array, solar panels, and integrated stackups of many sub-panels. Operations 900 of FIG. 9 are shown as being performed in a particular sequencing, however, other sequencing can be employed for selected operations.

In operation 910, an additive manufacturing technique is employed to manufacture a stackup assembly of sub-panels coupled at least by one perimeter edge into pairs. An example stackup assembly is shown in FIG. 4 as stackup assembly 405, although variations are possible. When half-panels are manufactured, then a single edge is typically coupled within each pair, and additional removable or temporary tabs might be employed to couple pairs to each other for stability during manufacturing. When other sub-panel configurations are employed, then more than two sub-panels might be manufactured as connected along selected edges.

Operation 911 includes cooling the stackup assembly to an ambient temperature, such as room temperature or temperatures safe for stackup handling. For example, when a laser powder bed fusion additive manufacturing process is employed, heat might be generated by the process which is retained in the material forming the stackup assembly. This heat can be shed to the environment or removed with cooling apparatuses. Excess material from the manufacturing process can be removed from the stackup assembly (operation 912), such as excess powder from a laser powder bed fusion additive manufacturing process. Then a stress relief heating or annealing (operation 913) can be performed on the stackup assembly before separation into sub-assemblies (operation 914). The separation can include cutting edge-coupled sub-assemblies from the main stackup assembly.

In operation 915, each edge-coupled sub-assembly can have anodization and dielectric layers applied over selected surfaces or portions thereof. The sub-assemblies can be opened or folded outward to form full panel assemblies, which may be bolted or welded into the opened configuration (operation 916). Then, photovoltaic cells can be attached to one or more faces of the full panel assemblies in operation 917. While the examples herein discuss applying photovoltaic cells to a front face, other examples might instead use the rear face or both faces. Cabling for power links, communication, status, control, and other signaling can be attached to one or more faces in operation 918. This cabling can be fitted into cable stays or retention elements which are configured to attach to features manufactured into a selected face of the panels. Finally, individual full panel assemblies with photovoltaic cells and cabling attached can be coupled in operation 919 into larger assemblies forming solar arrays of one or more full panels. Hinges or other coupling means might be employed between full panel assemblies, and various hinges, gimbals, mounts, or other hardware included to mount the solar array to a vehicle, satellite, or other structure for use.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method, comprising:
   forming, by an additive manufacturing technique, a stackup of connected pairs of half-panels each comprising a webbing structure on a rear face coupled by an internal lattice to a skin layer on a front face;
   detaching the connected pairs of half panels from the stackup;
   assembling a selected pair of the connected half-panels into a full panel; and
   attaching photovoltaic cells to a corresponding front face of the full panel.

2. The method of claim 1, comprising:
   applying a passivation coating to at least the skin layers of the selected pair;
   applying a dielectric isolation layer over at least a portion of the passivation coating on the front faces of the selected pair; and
   attaching the photovoltaic cells onto the dielectric isolation layer of the corresponding front face of the full panel.

3. The method of claim 1, wherein the front faces and the rear faces of the connected half-panels are coupled by the internal lattice comprising a selected material that also forms the webbing structures and the skin layers of the connected half-panels.

4. The method of claim 1, wherein the webbing structure of the connected half-panels comprises a pseudo-isogrid webbing comprising a patterned arrangement of isosceles triangles.

5. The method of claim 4, wherein assembling the selected pair into the full panel comprises folding out the selected pair into a generally planar configuration and fastening mated ends of the selected pair.

6. The method of claim 1, comprising:
   forming, by the additive manufacturing technique, clip attachment features integrated into the rear face; and
   routing wiring for the photovoltaic cells across the rear face of the full panel with clips inserted to the clip attachment features.

7. The method of claim 1, comprising:
   forming a solar array comprising two or more full panels coupled by hinge elements.

8. The method of claim 1, comprising:
attaching the solar array to a satellite for orbital deployment.

9. The method of claim 1, wherein the additive manufacturing technique comprises a laser powder bed fusion technique.

10. A method, comprising:
forming, by an additive manufacturing process, a plurality of paired half-panels, each of the half-panels comprising an integrated construction having a webbing structure substantially establishing a rear face connected to a skin layer substantially establishing a front face;
heating the plurality of paired half-panels to achieve a stress relief property in a material of the integrated construction;
separating connected pairs of half-panels from the plurality of paired half-panels;
applying one or more coatings to the connected pairs;
opening the connected pairs to establish full panels coupled at corresponding sides;
attaching photovoltaic elements to front faces of the full panels.

11. The method of claim 10, comprising:
forming the plurality of paired half-panels in a single workpiece from the additive manufacturing process such that the plurality of paired half-panels share the integrated construction.

12. The method of claim 10, comprising:
forming, by the additive manufacturing process, wire clip attachment features into the webbing structure of the rear face for each of the connected pairs; and
routing wiring for the photovoltaic elements across the webbing structure through clips installed into the clip attachment features.

13. The method of claim 10, wherein applying the one or more coatings to the connected pairs comprises:
applying an anodization treatment to at least portions of the front faces of the connected pairs;
applying an electrical isolation layer to the front faces of the connected pairs after the anodization treatment; and
wherein the photovoltaic elements are coupled onto the electrical isolation layer using at least one among an adhesive, clips, or fasteners.

14. The method of claim 10, wherein the webbing structure comprises a pseudo-isogrid webbing comprising a patterned arrangement of isosceles triangles.

15. The method of claim 10, comprising:
forming, by an additive manufacturing process, an internal lattice comprising the integrated construction that couples the front faces to the rear faces for each of the connected pairs.

16. The method of claim 10, comprising:
cooling the plurality of paired half-panels to an ambient temperature prior to heating the plurality of paired half-panels to achieve the stress relief property.

17. The method of claim 10, wherein the additive manufacturing technique comprises a laser powder bed fusion technique.

* * * * *